(12) United States Patent
Shields et al.

(10) Patent No.: US 7,749,091 B2
(45) Date of Patent: Jul. 6, 2010

(54) METHOD, SYSTEM AND APPARATUS FOR ACHIEVING LEVEL BALANCE IN AN INSTRUMENT

(75) Inventors: Daniel D. Shields, Albuquerque, NM (US); Richard Gustin, Albuquerque, NM (US)

(73) Assignee: High Desert Dynamics, LLC., Albuquerque, NM (US)

( * ) Notice: Subject to any disclaimer, the term of this patent is extended or adjusted under 35 U.S.C. 154(b) by 187 days.

(21) Appl. No.: 11/998,889

(22) Filed: Dec. 3, 2007

(65) Prior Publication Data

US 2008/0127721 A1    Jun. 5, 2008

Related U.S. Application Data

(60) Provisional application No. 60/872,737, filed on Dec. 1, 2006.

(51) Int. Cl.
   *A63D 15/08*    (2006.01)
(52) U.S. Cl. ....................................................... 473/44
(58) Field of Classification Search .................... 473/44
   See application file for complete search history.

(56) References Cited

U.S. PATENT DOCUMENTS

| | | | |
|---|---|---|---|
| 3,075,768 A * | 1/1963 | Karns | ........................ 473/297 |
| 3,844,321 A | 10/1974 | Cook | |
| 5,183,264 A * | 2/1993 | Lanctot | ........................ 473/520 |
| 5,203,561 A * | 4/1993 | Lanctot | ........................ 473/282 |
| 5,244,209 A * | 9/1993 | Benzel | ........................ 473/297 |
| 5,385,348 A * | 1/1995 | Wargo | ........................ 473/338 |
| 5,792,011 A * | 8/1998 | Kuebler | ........................ 473/520 |
| 2005/0261074 A1 * | 11/2005 | Andersen | ........................ 473/231 |
| 2006/0135295 A1 * | 6/2006 | Szelenyi | ........................ 473/519 |
| 2007/0010340 A1 * | 1/2007 | Miki | ........................ 473/44 |

FOREIGN PATENT DOCUMENTS

| | | | |
|---|---|---|---|
| GB | 190606968 A | * | 5/1906 |
| GB | 2405808 A | * | 3/2005 |

* cited by examiner

*Primary Examiner*—Lisa M Caputo
*Assistant Examiner*—Punam Roy
(74) *Attorney, Agent, or Firm*—Hilary A. Noskin; Deborah A. Peacock; Peacock Myers, P.C.

(57) ABSTRACT

The present invention is a method, system and/or apparatus for achieving a level balance through the use of one or more fluids, solids and/or gases (identified herein as "liquidwick"), whether individually applied or applied in selected combination, or whether applied through phase-shifting combinations, the liquidwick being partially or fully placed in a closable container which is securely insertable into a cavity within an instrument desired to achieve balance (such as, for example, a pool stick or a golf club).

5 Claims, 9 Drawing Sheets

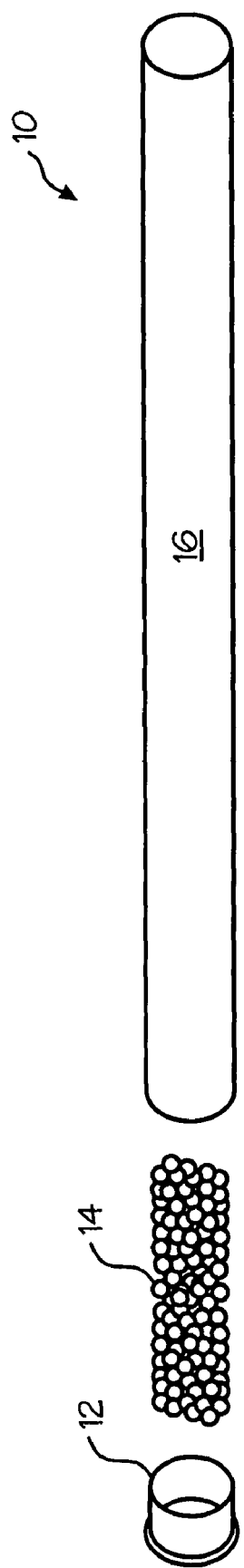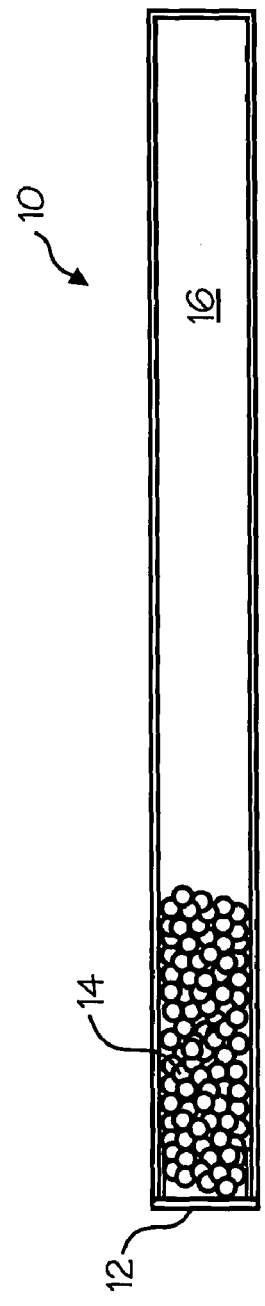

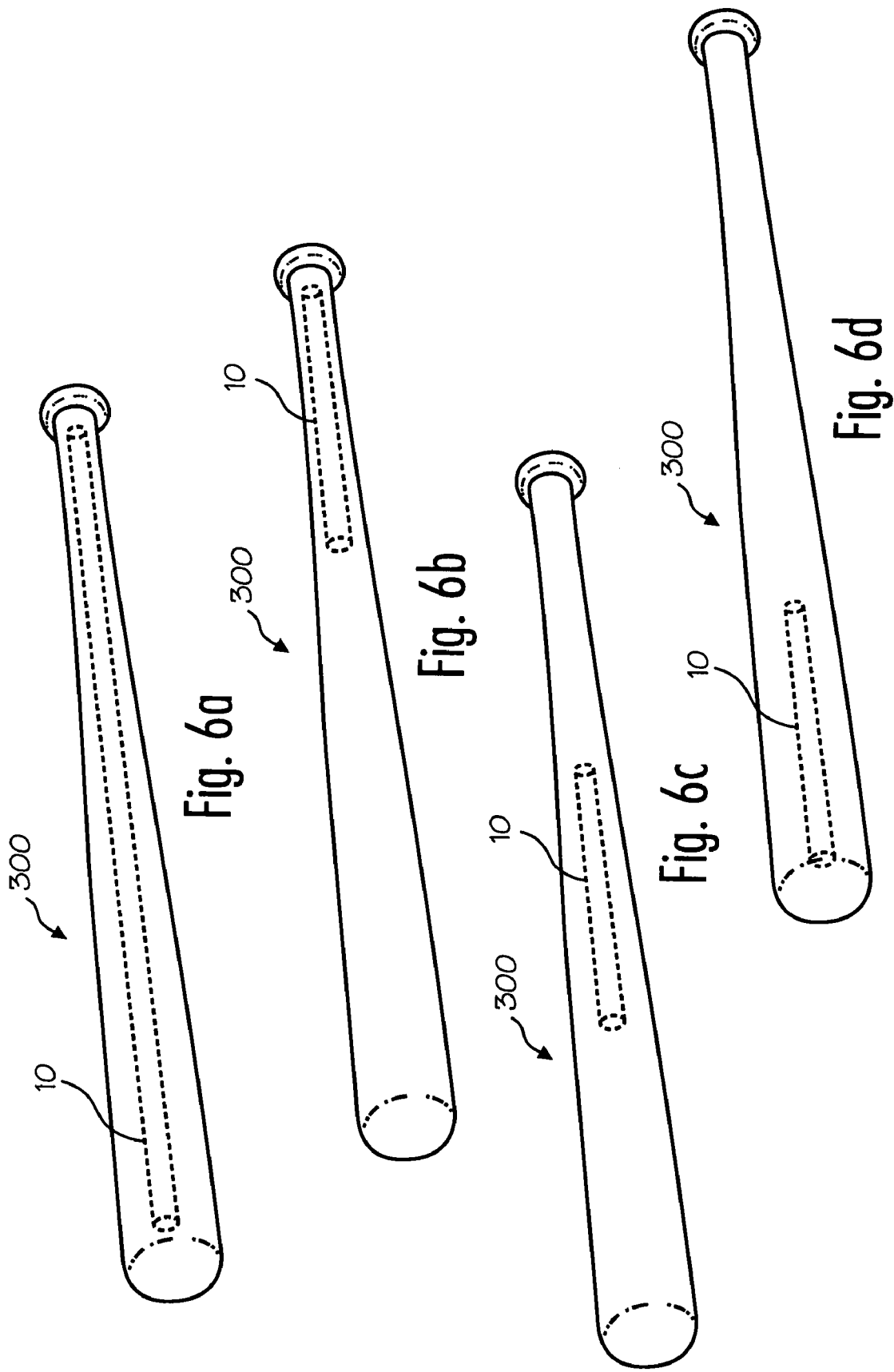

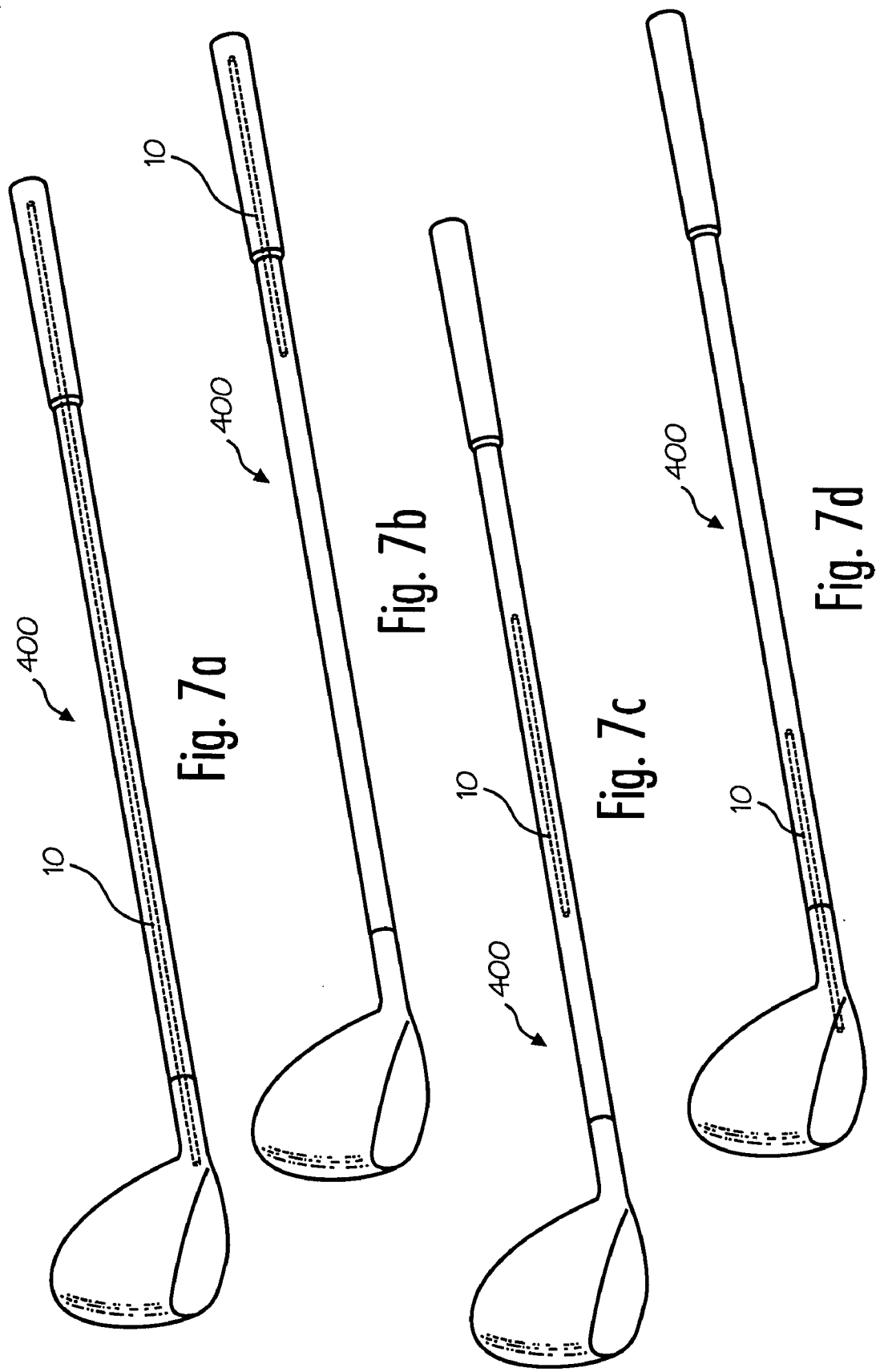

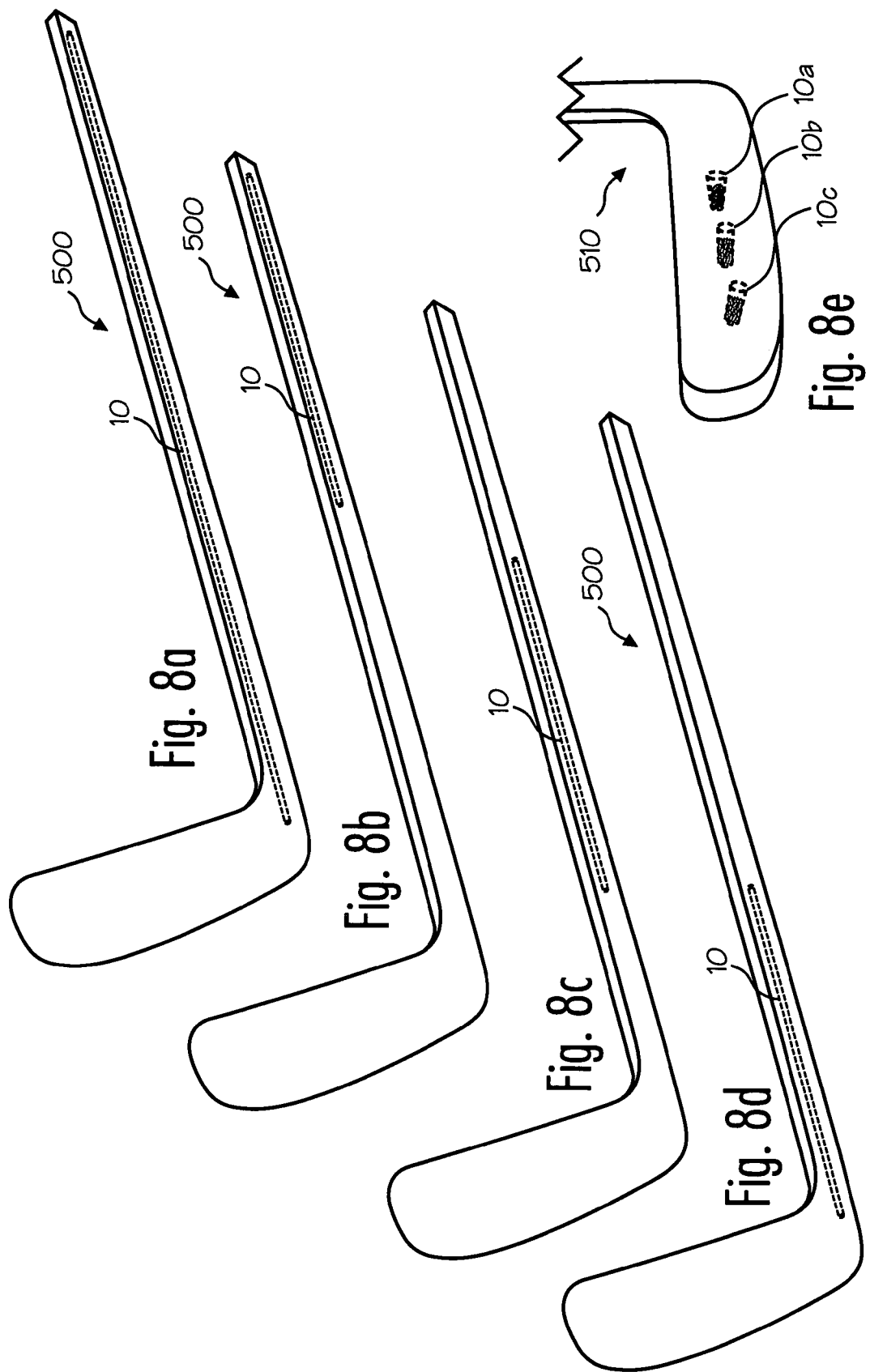

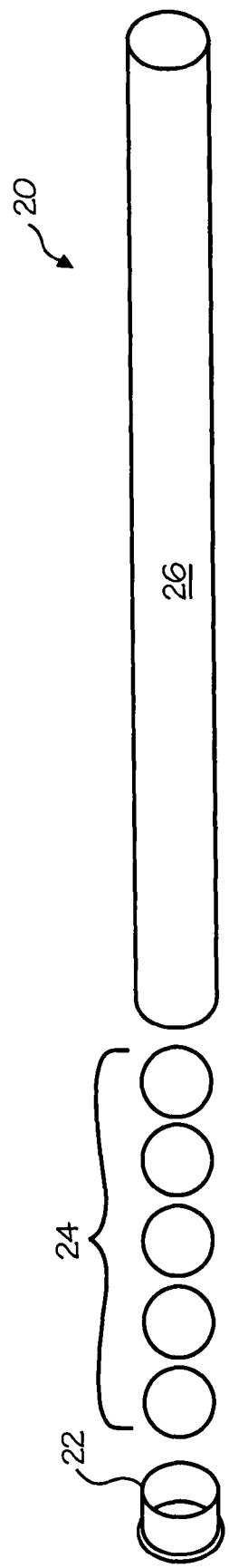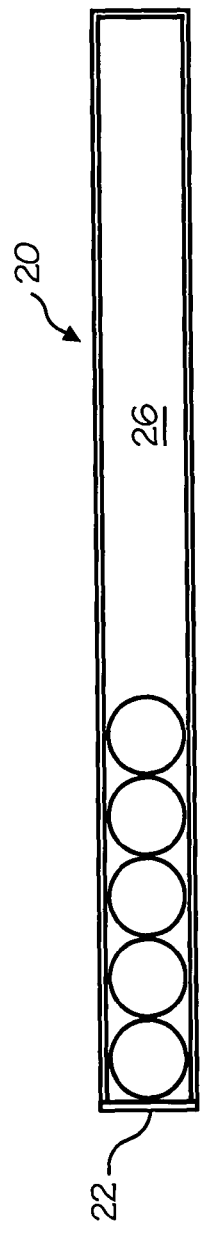
Fig. 9
Fig. 10

METHOD, SYSTEM AND APPARATUS FOR ACHIEVING LEVEL BALANCE IN AN INSTRUMENT

CLAIM OF PRIORITY

The present invention claims priority based upon U.S. Provisional Patent Application No. 60/872,737, filed Dec. 1, 2006 to Shields et al. and titled "Method, System and Apparatus for Achieving Level Balance in an Instrument", which is hereby incorporated by reference.

FIELD OF INVENTION

The present invention is generally directed towards methods, systems and apparatus for achieving a level balance in an instrument through the use of one or more fluids, solids and/or gases, whether individually applied or applied in selected combination, or whether applied through phase-shifting combinations.

BACKGROUND OF THE INVENTION

In modern times, as the skill of the novice sportsman increases, so does the need to assist such novices to rapidly develop their skills relating to an instrument for the particular sport desired (such as, for example, pool cues for the sport of pool, golf clubs for the sport of golf, tennis rackets for the sport of tennis, hockey sticks for the sport of hockey or like sports devices). While numerous training aids exist to assist the novice to develop the proper rhythm, control and finesse required to adequately control the instrument, there is currently no technology directed towards assisting the amateur or novice sportsman feel the weight of the instrument as it is in use, and further, which would allow the novice to feel the weight transfer that occurs during the use of the instrument as it is utilized in the sport. Moreover, the art lacks any disclosure of any technology which, along with the foregoing needs, allows the user to optionally audibly hear the approximate moment such weight transfer occurs while the instrument is in use.

What is required is a system, method or apparatus for substantially achieving a level balance in an instrument, and preferably, an instrument which is primarily used in sports and/or the construction trades.

SUMMARY OF THE INVENTION

The following summary of the invention is provided to facilitate an understanding of some of the innovative features unique to the present invention, and is not intended to be a full description of variations that may be apparent to those of skill in the art. A full appreciation of the various aspects of the invention can be gained from the entire specification, claims, drawings, and abstract taken as a whole.

In an exemplary embodiment of the invention, the present invention is an automatic method, system and/or apparatus adapted to achieve a level balance through the use of weighted material insertable into a closed cavity, channel or, chamber placed, formed or drilled within an instrument desired to be balanced. In one preferred embodiment, the present invention is an encapsulated tube or like container having an interior channel, the channel being filled with a pre-determined amount of a pre-determined fluid, solid and/or gas, the tube being adapted for secure insertion into an instrument.

As defined in this invention, the term "liquidwick" refers to the one or more fluids, solids and/or gases which may be insertable into the container, whether individually applied or applied in pre-selected combination, and further includes the definition of these materials as such materials may be adapted to transform through phase-shifting combinations (such as, for example, solid to liquid, liquid to gas, gas to solid, or any variation thereof). The term "liquidwick" is also equivalent to the term "fluid" (as that term was used in the corresponding provisional application of this invention). Should specific identification of material which is "gas", "liquid" or "solid" by nature be used, they are being used in conjunction with a specific embodiment, and are not used to limit this disclosure in any way. As such, examples of representative fluids may include any type of fluid or a collection of small solids. Thus, representative fluids may include mercury, oil, water or even a highly viscous liquid, while representative solids include grains of sand, ball bearings, bb's, marbles, buckshot and birdshot pellets.

The novel features of the present invention will become apparent to those of skill in the art upon examination of the following detailed description of the preferred embodiment or can be learned by practice of the present invention. It should be understood, however, that the detailed description of the preferred embodiment and the specific examples presented, while indicating certain embodiments of the present invention, are provided for illustration purposes only because various changes and modifications within the spirit and scope of the invention will become apparent to those of skill in the art from the detailed description, drawings and claims that follow.

BRIEF DESCRIPTION OF THE DRAWINGS

The accompanying figures further illustrate the present invention and, together with the detailed description of the preferred embodiment, assists to explain the general principles according to the present invention.

FIG. 1 is an exploded or otherwise open view of the representative elements found in one embodiment of the present invention as it appears sans the corresponding instrument;

FIG. 2 is a graphic representation of FIG. 1 depicting the elements in a closed configuration;

FIG. 6a illustrates another embodiment of the present invention as it may be incorporated in to the entire length of a baseball bat;

FIG. 6b illustrates another embodiment of the present invention as it may be incorporated in to a near end of a baseball bat;

FIG. 6c illustrates another embodiment of the present invention as it may be incorporated in to a central or middle portion of a baseball bat;

FIG. 6d illustrates another embodiment of the present invention as it may be incorporated in to a distal end of a baseball bat;

FIG. 7a illustrates another embodiment of the present invention as it may be incorporated in to the entire length of a golf club shaft;

FIG. 7b illustrates another embodiment of the present invention as it may be incorporated in to a near end of a golf club shaft;

FIG. 7c illustrates another embodiment of the present invention as it may be incorporated in to a central or middle portion of a golf club shaft;

FIG. 7d illustrates another embodiment of the present invention as it may be incorporated in to a distal end of a golf club shaft;

FIG. 8a illustrates another embodiment of the present invention as it may be incorporated in to the entire length of a hockey stick shaft;

FIG. 8b illustrates another embodiment of the present invention as it may be incorporated in to a near end of a hockey stick shaft;

FIG. 8c illustrates another embodiment of the present invention as it may be incorporated in to a central or middle portion of a hockey stick shaft;

FIG. 8d illustrates another embodiment of the present invention as it may be incorporated in to a distal end of a hockey stick shaft;

FIG. 8e illustrates another embodiment of the present invention as it may be incorporated into a head of a hockey stick.

FIG. 9 is an exploded or otherwise open view of representative elements found in another embodiment of the present invention as it appears sans the corresponding instrument; and FIG. 10 is a graphic representation of FIG. 9 depicting the elements in a closed configuration.

Additional aspects of the present invention will become evident upon reviewing the non-limiting embodiments described in the specification and the claims taken in conjunction with the accompanying figures, wherein like reference numerals denote like elements.

Figure 3:
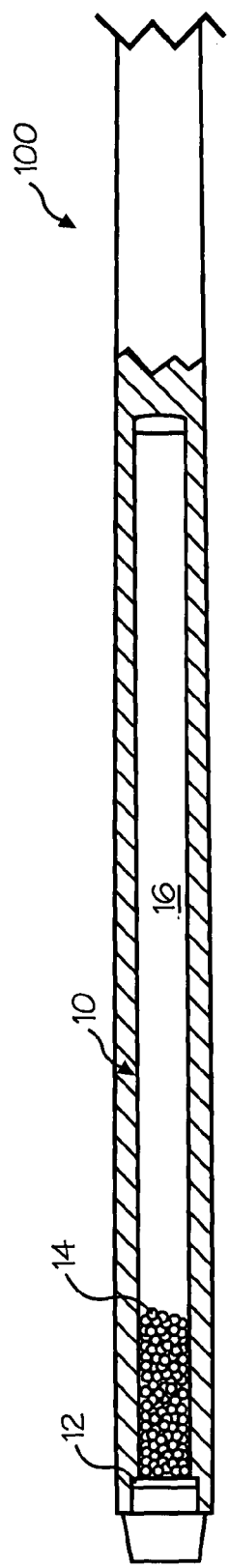
FIG. 3 illustrates one embodiment of the present invention as it may be incorporated in to a near end of a pool cue stick.

It should also be appreciated that the particular implementations disclosed herein are illustrative of the invention and its best mode, and are not intended to otherwise limit the scope of the present invention in any way. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

DETAILED DESCRIPTION OF THE PREFERRED EMBODIMENT

The present invention generally herewith discloses an automatic method, system and/or apparatus adapted to achieve a level balance through the use of one or more fluids, solids and/or gases, whether individually applied or applied in selected combination, or whether applied through phase-shifting combinations, all of which may be insertable into a cavity or chamber in an instrument desired to be balanced.

A representative embodiment of the present invention is illustrated in FIG. 1 comprising a container or holding chamber 16 adapted to receive liquidwick 14, the container being closable in this embodiment through a closure 12. Of course, closure 12 may not be needed if container 16 can be formed to receive liquidwick 14, and be formed for self-closure to retain and store the liquidwick 14. When closed, the entire apparatus 10 to achieve a level balance in an instrument is illustrated in FIG. 2. Preferably, in one embodiment, the container or holding chamber 16 is adapted to retain liquidwick ⅛ to ¾ of available space inside the interior of container 16. The container may then be fixedly insertable or sealable into an instrument (such as a sports device, for example) to substantially achieve balance. In still another embodiment, the container may be formed out of any conventional formable material, including plastic, polypropylene, polyethylene, PVC, metal, any like material or any combination thereof.

The exterior surface of container 16 may be formed to accept a coupling means not shown in the attached Figures (such as, for example, adhesive or glue) which allows for secure placement within a pre-located cavity of a sports device. Preferably, such a coupling means is adapted to withstand both high-pressure environments (to account, for example, of the contraction and expansion which may occur with the sports device) and for weather concerns (such as, for example, humidity, rain, etc.). A representative adhesive could be, in one embodiment, a potting material having a strengthened work life, a rapid setting time and a short cure time. The adhesive should be adapted to be applied either to the container's 16 exterior surface or to the sports device's cavity.

The overall weight of the closed container (when inserted in to a representative sports device) should preferably conform to any authoritative sports rules and regulations for that particular sports device. Similarly, the overall length of the container (when inserted in to the sports device) should preferably conform to the same authoritative sports rules and regulations.

Figure 4:
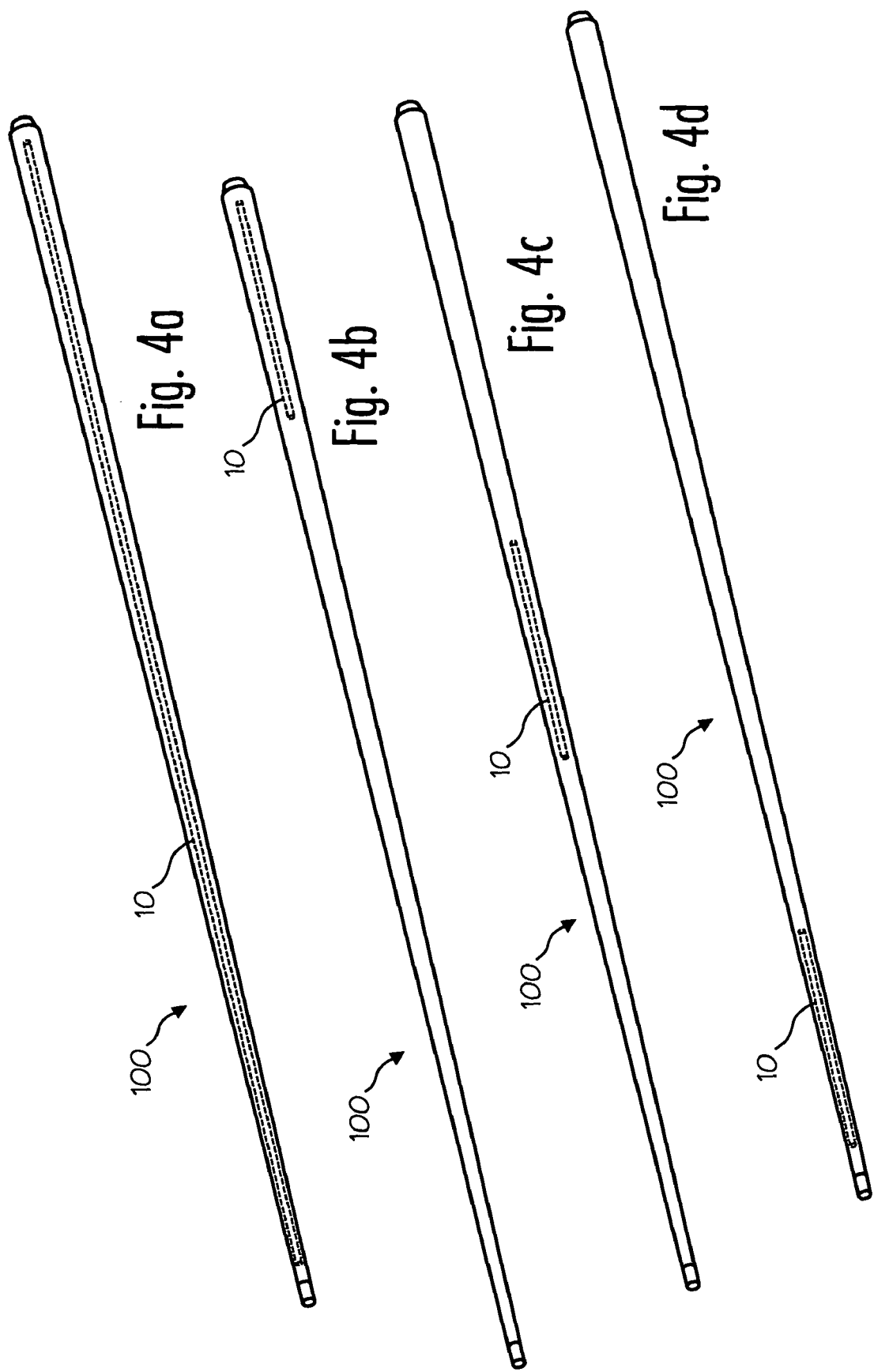
FIG. 4a illustrates another embodiment of the present invention as it may be incorporated in to the entire length of a pool cue stick.
FIG. 4b illustrates another embodiment of the present invention as it may be incorporated in to a near end of a pool cue stick.
FIG. 4c illustrates another embodiment of the present invention as it may be incorporated in to a central or middle portion of a pool cue stick.
FIG. 4d illustrates another embodiment of the present invention as it may be incorporated in to a distal end of a pool cue stick.

One representative embodiment of the present invention is applied to a pool cue stick sports device is seen in FIGS. 3-4d. In this embodiment, a container 10 is introduced for secure insertion in to the pool cue stick at a pre-determined location. A pool cue may be bored to form one or more cavities at one or more pre-determined locations in the handle of the pool cue or stick. As seen in FIGS. 4b-4d, a representative cavity may be formed at a near end of the pool cue stick (FIG. 4b), a middle portion (FIG. 4c) or at a distal end (FIG. 4d). Alternatively, such a bored cavity may be formed through substantially the entire length of the pool cue stick as seen in FIG. 4a. While not shown, a plurality of bored cavities placed in selected portions of the pool cue stick may also be implemented as an optional embodiment. At least one container may then be securely inserted (through the coupling means, for example) or sealed into each cavity.

In use, it is believed that the pool cue stick product produced in accordance with this disclosure will assist novice or amateur pool players to more properly use the pool cue stick because the present invention will allow the user to properly feel the weight of the pool cue stick as the stick, during play or practice by the user, travels in an appropriate horizontal plane to strike the cue ball. Moreover, the present invention allows the user to properly get a feel for the weight transfer and corresponding momentum that occurs when the pool cue stick is used to strike a pool ball during play or practice, thereby promoting the user to maintain a proper follow through stroke upon striking the ball. Additionally, it is believed that when metallic liquidwick is used (such as lead bird shot or metallic balls), the present invention allows the user to audibly hear the approximate moment that a transfer of weight occurs in the pool cue stick (which may indicate a problem with the user's swing, such as the pool cue stick going beyond an acceptable horizontal plane, which typically results in an incorrect shot). In operation, incorporating the present invention's technology with a pool cue will teach the pool player balance on the shot set up and follow through on the shot finish. Balance and follow through are two important elements of the pool shot for pool players to master. Once a player learns how to properly control a pool cue, they can then advance to the next step in pool training (e.g., the pool cue aim and shot).

Figure 5:
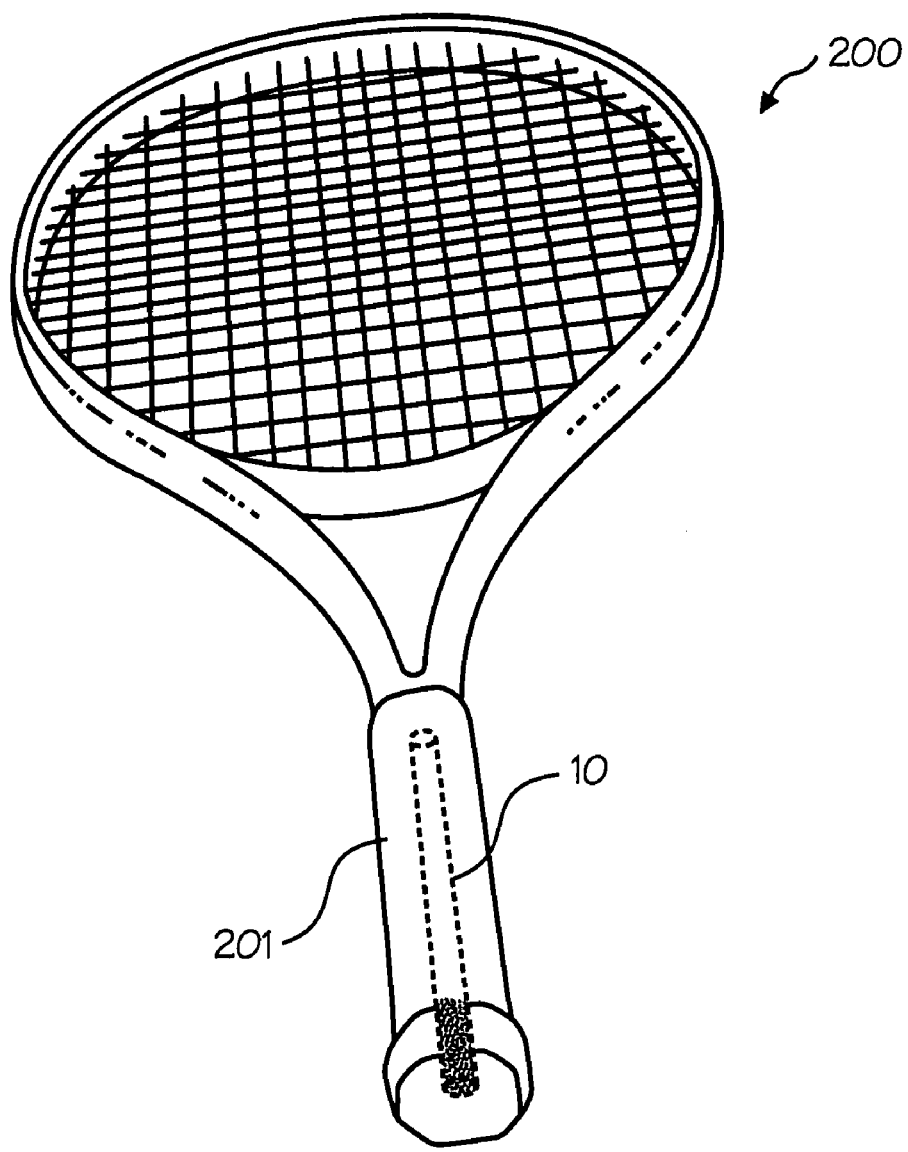
FIG. 5 illustrates another embodiment of the present invention as it may be incorporated in to a handle portion of a stringed instrument such as (as depicted) a tennis racket.

The present invention can also be applied to other sports devices such as a tennis racket. As seen in FIG. 5, a closed container 10 of the present invention may be placed within the handle 210 of a tennis racket 200.

In still another embodiment, the closed container 10 of the present invention may be placed or formed within a baseball bat 400 as shown in FIGS. 6a-6d. In this embodiment, a container 10 is introduced for secure insertion in to the bat 300 at a pre-determined location. The bat 300 may be bored to form one or more cavities at one or more pre-determined locations in the bat 300. As seen in FIGS. 6b-6d, a representative cavity may be formed at a near end of the bat (FIG. 6b), a middle portion (FIG. 6c) or at a distal end (FIG. 6d). Alternatively, such a bored cavity may be formed through substantially the entire length of the bat as seen in FIG. 6a. While not shown, a plurality of bored cavities placed in selected portions of the bat may also be implemented as an optional embodiment. At least one container may then be securely inserted (through the coupling means, for example) or sealed into each cavity formed in the bat.

Similarly, the present invention may also be applied to other sports devices such as golf club sports devices. There are many variations applicable to the present invention when the technology is employed with a golf club sports device. For example, it is well known that a golf club's shaft is the long, tubular member (usually formed from composite steel or graphite) which connects the grip and the golf club head. In still another embodiment, the closed container 10 of the present invention may be placed or formed within a golf club shaft 400 as shown in FIGS. 7a-7d. In this embodiment, a container 10 is introduced for secure insertion in to the golf club shaft 400 at a pre-determined location. The golf club shaft 400 may be formed with one or more cavities at one or more pre-determined locations in the golf club shaft 400. As seen in FIGS. 7b-7d, a representative cavity may be formed at a near end of the golf club shaft (FIG. 7b), a middle portion (FIG. 7c) or at a distal end (FIG. 7d). Alternatively, such a bored cavity may be formed through substantially the entire length of the golf club shaft as seen in FIG. 7a. While not shown, a plurality of bored cavities placed in selected portions along the length of the golf club shaft may also be implemented as an optional embodiment. At least one closed container 10 may then be securely inserted (through the coupling means, for example) or sealed into each cavity formed in the golf club shaft as seen in FIGS. 7a-7d.

Figure 7E:
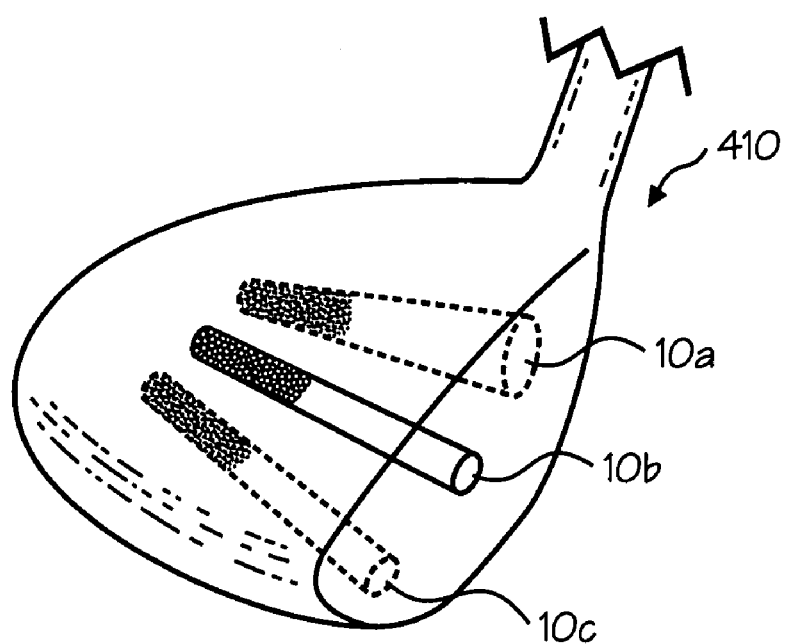
FIG. 7e illustrates another embodiment of the present invention as it may be incorporated in to a head of a golf club, either as an individual component or in plurality, and either in substantial alignment with the head's intended target, or at some pre-defined angle from the head's intended target, FIG. 7e also illustrating the use of a conical chamber as an embodiment of the present invention.

Another example of how the present technology can be used to substantially achieve self balancing with the head of a golf club sports device is illustrated in FIG. 7e. Here, at least one container 10 is formed or embedded within the golf club head 410, the container being preferably positioned within the golf club head so that its elongated length is substantially parallel to the preferred initial flight plane of a golf ball as the golf club head impacts the golf ball (e.g., the ball flight path, which is generally located in the area known in the industry as the golf club's "sweet spot" as generally depicted by the location of container 10b in FIG. 7e). As seen in this illustration, the channel can also be formed or embedded at different angles from the ball flight path (as generally depicted by the location of containers 10a and 10c in FIG. 7e). As should be recognized now by those of skill in the art, the container 10 is not required to be a cylindrical shape, but may be formed in any type of angular elongated fashion which is adapted to securely retain the liquidwick therein (such as the optional conical container 10a shown in FIG. 7e). In this embodiment, the user will have more confidence when striking the golf ball, and likely will generate more club head speed, thereby optimizing the golf ball flight path and distance.

Moreover, while not shown, those of skill in the art will realize that one or more of the present invention's containers may be equidistantly embedded within the golf club at an area adjacent to the golf club's leading edge (which is generally known as the bottom plane of the golf club adjacent to the golf club sole). In this embodiment, it is believed that the extra self-balancing technology available to the club's leading edge will provide novice and amateur golfers assistance to hit golf balls that may appear unplayable due to the golfer's lack of experience (such as, for example, hitting a golf ball out of higher grass, sand or from the rough).

In still another embodiment, the closed container 10 of the present invention may be placed or formed within a hockey stick shaft 500 as shown in FIGS. 8a-8d. In this embodiment, a container 10 is introduced for secure insertion in to the hockey stick shaft 500 at a pre-determined location. The hockey stick shaft 500 may be formed with one or more cavities at one or more pre-determined locations in the hockey stick shaft 500. As seen in FIGS. 8b-8d, a representative cavity may be formed at a near end of the hockey stick shaft (FIG. 8b), a middle portion (FIG. 8c) or at a distal end (FIG. 8d). Alternatively, such a bored cavity may be formed through substantially the entire length of the hockey stick shaft as seen in FIG. 8a. While not shown, a plurality of bored cavities placed in selected portions along the length of the hockey stick shaft may also be implemented as an optional embodiment. At least one closed container 10 may then be securely inserted (through the coupling means, for example) or sealed into each cavity formed in the hockey stick shaft as seen in FIGS. 8a-8d.

Similar to the other embodiments disclosed above, at least one container 10 may be formed or embedded within the hockey stick head 510 through one or more channels formed in the hockey stick head 10a, 10b, 10c, etc., the container being preferably positioned within the hockey stick head so that its elongated length is substantially parallel to the preferred initial flight plane of a hockey puck as the hockey stick head impacts the puck (as generally depicted by the location of container 10b in FIG. 8e). As seen in this illustration, the channel can also be formed different angular locations in the head 510 (as generally depicted by the varying angular location of containers 10a and 10c in FIG. 8e)

The present invention may not be limited to the use of liquidwick. Thus, in still another embodiment 20 as shown in FIGS. 9 and 10, the liquidwick of FIG. 1 may be replaced with one or more cylindrical spheres 24 as seen in FIGS. 9 and 10. This embodiment comprises a container or holding chamber 26 adapted to receive one or more cylindrical spheres 24, the container 26 being closable in this embodiment through a closure 22. Of course, closure 22 may not be needed if container 26 can be formed for self-closure. When closed, the entire apparatus to achieve a level balance in an instrument is illustrated in FIG. 10. Preferably, each sphere 24 is a steel or steel alloy ball of a pre-defined size. In this embodiment, the container or holding chamber 26 is adapted to retain the spheres from ⅛ to ¾ of available space inside the interior of container 26. The container may then be fixedly insertable or sealable into an instrument (such as a sports device, for example) to substantially achieve balance. In this embodiment, it is believed that because larger spheres are disclosed, the spheres 24 will be more sensitive to angular momentum when the sports device is in use (e.g., for a pool cue stick, the spheres will provide the user with a more tactile feel when the stick is move away from the horizontal striking plane).

The present invention's disclosure of a self leveling, free flowing container with liquidwick inserted into an instrument creates the balanced environment required when the instrument (such as a pool stick) is placed horizontal or in pool shot position. Balance is achieved through the self leveling of the liquidwick itself in the container with respect to the earth. The weight of the liquidwick creates its own forward momentum and inertia when an object (such as a pool ball) is struck. A player's complete and balanced follow-through of the sports device is assisted through the liquidwick's ability to flow freely inside the container when partially filled. After a pool ball (or other sporting good item such as a hockey puck) is struck, the free flowing liquid or solid will move in a forward direction forcing the handle, shaft or club head to move forward in unison, creating an assisted, balanced and complete follow through. Thus, after practice with a self-balancing pool cue, the beginning pool player will achieve a higher level of confidence, making the beginner more consistent thus increasing their odds of winning the pool game.

Of course, those of skill in the art will realize that while benefits for achieving self balance are highly desired in the sporting goods industry, the present invention may also be used in other industries that require self-balance.

The present invention may be embodied as a method, system, an apparatus or a device. Other variations and modifications of the present invention will be apparent to those of ordinary skill in the art, and is not limited except by the appended claims. The particular values and configurations discussed above may be varied, and are cited to illustrate particular embodiments of the present invention. It is contemplated that the use of the present invention can involve components having different characteristics as long as the principles disclosed herein are followed.

The foregoing description of the preferred embodiments of the invention has been presented for the purposes of illustration and description. Other variations and modifications of the present invention will be apparent to those of ordinary skill in the art, and is not limited except by the appended claims. The particular values and configurations discussed above can be varied, and are cited to illustrate particular embodiments of the present invention. It is contemplated that the use of the present invention can involve components having different characteristics as long as the principles disclosed herein are followed.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

The invention claimed is:

1. A system of achieving level balance in a billiard cue stick, the billiard cue stick having a near end, a middle portion, and a distal end, the system comprising pre-selected liquidwick and a closable single chamber, the pre-selected liquidwick being fixedly insertable into the chamber without completely filling the chamber, the billiard cue stick adapted to securely receive, store and maintain the chamber between the near end portion and the middle portion; the chamber not being completely filled with liquidwick in order to allow a user to audibly hear the approximate moment a transfer of weight occurs in the billiard cue stick.

2. The system of claim 1 wherein the liquidwick is selected from the group of liquids, solids and any combination thereof.

3. The system of claim 1 wherein the liquidwick is a plurality of spherical weighted balls.

4. The system of claim 2, wherein the liquidwick is adapted to shift position through forward momentum and inertia combinations.

5. The method of making the product in accordance with the system of claim 1 comprising:
    providing a billiard cue stick having a near end, a middle portion, and a distal end and a closable single chamber;
    pre-selecting the liquidwick, wherein the liquidwick comprises liquid, solid and any combination thereof;
    inserting, fixedly, the pre-selected liquidwick into the chamber without completely filling the chamber, wherein the billiard cue stick is adapted to securely receive, store and maintain the chamber between the near end portion and the middle portion; and
    not filling the chamber completely with liquidwick in order to allow a user to audibly hear the approximate moment a transfer of weight occurs in the billiard cue stick.

* * * * *